United States Patent
Howard

(10) Patent No.: US 8,514,973 B2
(45) Date of Patent: *Aug. 20, 2013

(54) PRE-EQUALISATION FOR UMTS BASE STATION

(75) Inventor: Paul Howard, Bristol (GB)

(73) Assignee: IP Wireless, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/793,287

(22) Filed: Jun. 3, 2010

(65) Prior Publication Data

US 2010/0298030 A1    Nov. 25, 2010

Related U.S. Application Data

(63) Continuation of application No. 10/531,152, filed as application No. PCT/GB03/04506 on Oct. 20, 2003, now Pat. No. 7,738,593.

(30) Foreign Application Priority Data

Oct. 18, 2002    (GB) .................................. 0224297.2

(51) Int. Cl.
    *H03H 7/30*    (2006.01)
(52) U.S. Cl.
    USPC .......................................... 375/297; 375/230
(58) Field of Classification Search
    USPC .................. 375/229, 230, 296, 297
    See application file for complete search history.

(56) References Cited

U.S. PATENT DOCUMENTS

| 5,627,823 | A |   | 5/1997 | Pillekamp |
| 5,627,826 | A |   | 5/1997 | Kameda et al. |
| 5,768,317 | A |   | 6/1998 | Fague et al. |
| 5,896,306 | A | * | 4/1999 | Aschwanden ................ 708/300 |

(Continued)

FOREIGN PATENT DOCUMENTS

| EP | 0 551 803 A1 | 7/1993 |
| EP | 0 827 295 A2 | 3/1998 |

(Continued)

OTHER PUBLICATIONS

3GPP (Mar. 2002). "3rd Generation Partnership Project; Technical Specification Group Radio Access Networks; BS Radio Transmission and Reception (TDD) (Release 1999)," 3GPP TS 25.105, V3.10.0, pp. 1-39.

(Continued)

*Primary Examiner* — David B. Lugo

(57) ABSTRACT

An arrangement (100) and method for RF filtering in a Node B of a UMTS TDD system by providing: a DAC converter (130) converting digital signals to analog signals; providing a narrow band analogue channel filter (150) filtering the analog signals; and providing a digital pre-equalizer FIR filter (120) coupled before the DAC (120) to filter the digital signals, the digital pre-equalizer filter means substantially correcting for non linear phase response (122) non-ideality and amplitude response non-ideality (124) in the analogue channel filter (150). This provides the following advantage(s): it enables 3GPP Node B co-location specifications to be met while providing both good transmit accuracy and acceptable ISI performance; and it allows filter center frequency to be field tuned in software, permitting a basic RF single-channel filter to used with its center frequency being field adjustable to a desired value centered on a UMTS channel.

18 Claims, 6 Drawing Sheets

(56) References Cited

U.S. PATENT DOCUMENTS

| | | | |
|---|---|---|---|
| 5,909,466 A | 6/1999 | Labat et al. | |
| 6,031,866 A * | 2/2000 | Oler et al. | 375/219 |
| 6,360,239 B1 * | 3/2002 | Laroche | 708/300 |
| 6,453,237 B1 | 9/2002 | Fuchs et al. | |
| 6,968,183 B2 * | 11/2005 | Sandberg | 455/418 |
| 7,027,540 B2 | 4/2006 | Wilson et al. | |
| 7,324,559 B2 | 1/2008 | McGibney | |
| 7,738,593 B2 | 6/2010 | Howard | |
| 2001/0038423 A1 * | 11/2001 | Twitchell et al. | 348/723 |
| 2002/0126220 A1 | 9/2002 | Wilson et al. | |
| 2002/0131488 A1 | 9/2002 | Allpress et al. | |
| 2004/0137910 A1 | 7/2004 | Beckmann et al. | |

FOREIGN PATENT DOCUMENTS

| | | |
|---|---|---|
| EP | 0 994 570 A1 | 4/2000 |
| EP | 1 235 360 | 8/2002 |
| GB | 2 351 624 | 1/2001 |
| GB | 2 369 016 | 5/2002 |
| WO | WO 00/46916 | 8/2000 |
| WO | WO 00/70751 | 11/2000 |
| WO | WO 02/082705 | 10/2002 |
| WO | WO 2004/039098 | 5/2004 |

OTHER PUBLICATIONS

3GPP (Mar. 2002). "3rd Generation Partnership Project; Technical Specification Group Radio Access Network; Physical Channels and Mapping of Transport Channels onto Physical Channels (TDD) (Release 1999)," 3GPP TS 25.221, V3.10.0, pp. 1-51.

ETSI (Dec. 2000). "Universal Mobile Telecommunications System (UMTS); UTRA (BS) TDD; Radio Transmission and Reception (3GPP TS 25.105 version 3.5.0 Release 1999)," ETSI TS 125 105 V3.5.0 pp. 1-18.

Hosur, S. et al. (Sep. 2000). "Design of Cyclically Permutable Codes for PN Code Acquisition in WCDMA TDD Mode," IEEE VTS Fall VTC2000 52nd Vehicular Technology Conference, Boston, MA, Sep. 24-28, 2000, pp. 581-587.

Koukourlis, S.S. et al. (Mar. 1995). "On the Capacity of an FFH-CDMA Packet Radio Network," IEEE Transactions on Broadcasting 41(1):17-22.

Lei, M. et al. (Jun. 2002). "Channel Estimation Based on Midamble in UTRA-TDD System," Proceeding of the International Conference on Telecommunications 2002, Beijing, China, Jun. 23-26, 2002, 2:434-438.

Search Report for GB Application No. 0224757.5 filed Oct. 24, 2002, mailed Apr. 28, 2003, one page.

Sills, J.A. (Aug. 2002). "Adaptive Power Amplifier Linearization by Digital Pre-Distortion Using Genetic Algorithms," IEEE Radio and Wireless Conference, Boston, MA, Aug. 11-14, 2002, pp. 229-232.

Springer, A. et al. (Sep. 2001). "Digital Predistortion-Based Power Amplifier Linearization for UMTS," European Conference on Wireless Technology, London, England, Sep. 27-28, 2001, pp. 185-188.

Steiner, B. et al. (Sep. 1993). "Uplink Channel Estimation in Sychronous CDMA Mobile Radio Systems with Joint Detection," The 4th International Symposium on Personal, Indoor and Mobile Radio Communications Yokohama, JP, Sep. 8-11, 1993, pp. 123-127.

Steiner, B. et al. (Jan.-Feb. 1994). "Optimum and Suboptimum Channel Estimation for the Uplink of CDMA Mobile Radio Systems with Joint Detection," European Transactions on Telecommunications and Related Technologies 5 (1):39-50.

Vaananen, O. et al. (Sep. 2002). "Reducing the Peak to Average Ratio of Multicarrier GSM and EDGE Signals," 13th IEEE International Symposium on Personal Indoor and Mobile Radio Communications, Lisboa, PT, Sep. 15-18, 2002, 1:115-119.

Great Britain Examination Report mailed Oct. 5, 2005, for GB Application No. 0224757.5, filed Oct. 24, 2002, 2 pages.

Great Britain Search Report mailed Mar. 3, 2003, for GB Application No. 0224297.2 filed Oct. 18, 2002, 2 pages.

International Search Report mailed on Mar. 19, 2004 for PCT Application No. PCT/GB03/04506, filed Oct. 24, 2003, six pages.

International Search Report mailed on Jun. 11, 2004 for PCT Application No. PCT/GB03/04587, filed Oct. 24, 2003, six pages.

\* cited by examiner

PRE-EQUALISATION FOR UMTS BASE STATION

RELATED APPLICATIONS

This application is a continuation of U.S. patent application Ser. No. 10/531,152 entitled PRE-EQUALISATION FOR UMTS BASE STATION and filed on Apr. 7, 2006, which is hereby incorporated herein by reference in its entirety.

FIELD OF THE INVENTION

This invention relates to RF (Radio Frequency) filtering, and particularly (though not exclusively) to such filtering in wireless communication applications.

BACKGROUND OF THE INVENTION

Specifications (3GPP TS 25.105 v3.10.0, 'BS Radio Transmission and Reception (TDD)', hereinafter referred to as [1]) by the 3GPP (3rd Generation Partnership Project) set out the performance of TDD (Time Division Duplex) Node B (base station in a 3GPP system) equipment. These specifications cover the 'Adjacent Channel Leakage Ratio' (AMA) for Node Bs specified for equipment that is co-sited with other TDD or FDD (Frequency Division Duplex) Node Bs operating on adjacent channels.

For co-siting purposes, stringent specifications on the transmit spectral purity of UMTS TDD Node Bs call for a single channel RF filter to be fitted after the power amplifier (PA). The specification of the RF filter is also extremely stringent and a very high Q passive filter is required in order to achieve the required stop-band. By adopting an RF filter with such a steep roll-off factor, it is unavoidable that the filter has an effect on the transmit accuracy; in fact, the inclusion of this filter may cause the Node B to fail the transmit accuracy requirement.

Passive RF equalization is not desirable due to the corresponding increase in the complexity of the RF filter and the fact the amplitude equalization is not possible without increasing the insertion loss across the pass band. Analogue baseband equalization is not desirable as the equalizer response needs to be matched to the RF filter to achieve optimum transmit accuracy and tuning baseband filters to match the RF filter, which in practice would have a significant impact on the production of the Node B.

A need therefore exists for digital pre-equalizer for RF filter wherein the abovementioned disadvantage(s) may be alleviated.

STATEMENT OF INVENTION

In accordance with a first aspect of the present invention there is provided a filter arrangement, for use in a wireless communication transmitter, as claimed in claim 1.

In accordance with a second aspect of the present invention there is provided a method, for filtering in a wireless communication transmitter, as claimed in claim 15.

BRIEF DESCRIPTION OF THE DRAWINGS

One digital pre-equalizer, arrangement and method for RF filtering incorporating the present invention will now be described, by way of example only, with reference to the accompanying drawing(s), in which.

DESCRIPTION OF PREFERRED EMBODIMENT(S)

Figure 1:
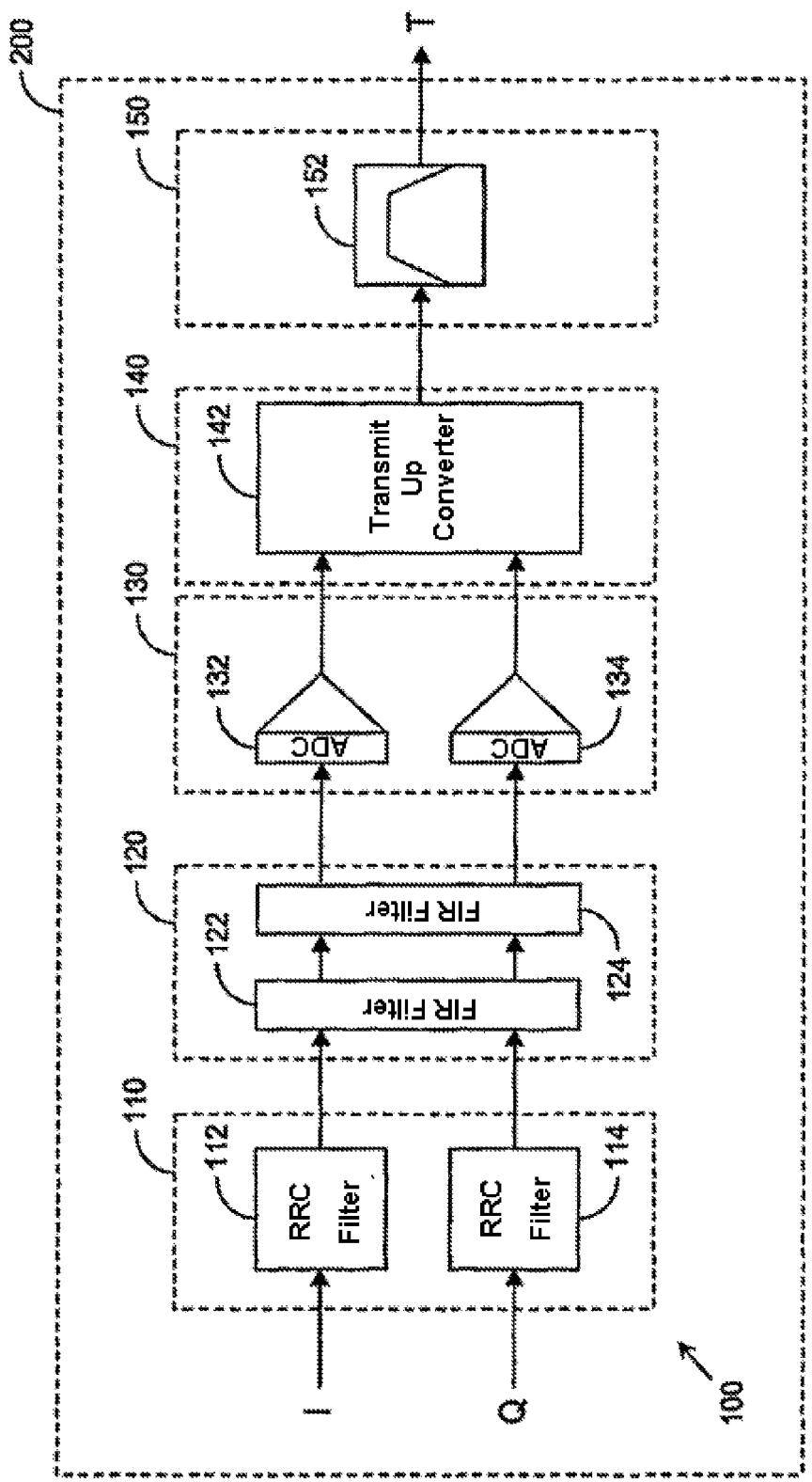
FIG. 1 shows a block-diagrammatic representation of an example transmitter architecture showing application of digital pre-equalization.

The 3GPP specifications [1] referred to above cover the 'Adjacent Channel Leakage Ratio' (ACLR) for Node Bs specified for equipment that is co-sited with other TDD or FDD Node Bs operating on adjacent channels.

ACLR is a measure of the ratio between the signal power transmitted in the desired channel of operation and the unwanted power transmitted in the channels adjacent to the desired channel. In the referenced version of the specifications, the adjacent channel power is specified as an absolute limit of −80 dBm in a measurement bandwidth of 3.84 MHz.

This limitation is necessary to ensure that the transmission of a Node B in channel 'A' does not cause unacceptable interference to another Node B receiving in channel 'B' at the same time.

In most Node Bs, the power transmitted in the adjacent channel is determined by the linearity of the power amplifier used in the Node B transmitter. With the PA technology available today, it is not possible to achieve these levels of adjacent channel power at typical Node B transmit powers levels. A brief example follows to illustrate this problem.

It is assumed that the adjacent channel transmissions are related to the level of the 3rd Order intermodulation products generated within the power amplifier. Taking an example Node B power amplifier with P1 dB equal to 44 dBm, and output IP3 of +63 dBm, the maximum wanted transmit power consistent with a −80 dBm adjacent channel power will typically be of the order of +15 dBm (31 mW) for a CDMA (Code Division Multiple Access) test signal. The power amplifier will dissipate close to 100 W, representing a DC to RF power conversion efficiency of 0.03%.

In order to achieve the specified ACLR, it is clear from the above analysis that, for reasonable transmit powers, a narrow band RF filter is required.

Using the power amplifier in the previous example as a reference, the typical ACLR expected at a transmit power of +34 dBm (2.5 W) will be of the order of 55 dB (or −21 dBm absolute). With this level of adjacent channel power generated in the PA, the RF Filter is required to provide at least 60 dB of protection to the adjacent channel.

This is also an extremely difficult specification to meet and requires the use of very high Q dielectric resonators.

In the considered base station transmitter the RF filter must immediately follow the power amplifier, and as such the filter must be realised using analogue techniques. It is well known that analogue filters generally exhibit non-constant group delay, although it is possible to approximate constant group delay at the expense of a significantly relaxed roll-off rate. However, for co-siting purposes, a very steep roll-off rate is essential, resulting in conflicting requirements between passband group delay variation and rate of filter roll-off.

Non-constant group delay has a direct effect on the quality of the transmitted signal, as the different frequency components within the signal experience different delays as they pass through the filter. The result is that the RF filter introduces inter-symbol-interference (ISI) to the transmitted signal.

The technical specifications in [1] define 'Error Vector Magnitude' (EVM) as a measure of transmit accuracy. The EVM is a ratio of the ideal received signal compared to the actual received signal, expressed as a percentage. The reference signal is filtered twice by a 'square-root raised-cosine' (RRC) filter, once in the transmitter and once in the measuring receiver; therefore, provided that there are no signal impairments, the received reference signal should be ISI free. It may be noted that the receiver timing is optimised to minimise the EVM.

Simulations of the EVM obtained with the single-channel RF filter present have shown that the EVM is typically 17%. These examples only consider the EVM contribution of the RF Filter, the rest of the transmit line up to this point is not included in this calculation.

The 3GPP specifications [1] specify the maximum EVM to be 12.5%; therefore it is clear that, even though the presence of the RF filter is required by one part of the specification, it causes a failure in the EVM part.

Although RF analogue equalization is possible, this approach is not preferred for a number of reasons such as increased size, cost, insertion loss and complexity. Also, the analogue equalization is optimised for the centre frequency of the filter, and it will be seen below that it is instead beneficial to optimise the equalization depending on the exact channel centre required by the application.

In order to achieve a suitable analogue equalization performance in order to obtain an acceptable EVM contribution from the RF filter, the passive equalizer will, typically, be almost as complex as the actual filter itself.

Another problem with the passive RF analogue equalization approach is that it is not suitable for realising amplitude equalizations without increasing the insertion loss across the whole band of the filter. This is because passive implementations can only create attenuation, not gain.

Having ruled out passive RF equalization, the designer is left with the possibility of baseband equalization. This can be accomplished either with passive or active analogue baseband filters or with a digital filter. As will be explained in greater detail below, in the preferred embodiment of the present invention, the digital filter solution is the only suitable solution in an application where the equalization required will need to be optimised for each individual filter and where it will not be possible to tune analogue equalizers in a production environment. The digital equalizing filter can be calculated by a computer program directly from a measurement of the RF filter to be equalized, thus having minimal impact on the production of the unit.

The channel centre frequencies in the UMTS radio interface are defined to be an integer multiple of 200 KHz, however the 5 MHz channel allocations are nominally defined between integer blocks of 5 MHz, e.g., 1900 MHz to 1905 MHz. Obviously, the true centre frequency is 1902.5 MHz in this example, which is not an integer multiple of 200 kHz. The exact choice of the centre frequency is up to the operator or the licensing authority. For the example channel allocation, two possible centre frequencies are possible: 1902.4 MHz or 1902.6 MHz.

As RF filters are expensive and have long lead-time for supply, it is not desirable to have two different filters for each 5 MHz block of spectrum. It is far more preferable to keep one filter in stock with the centre frequency at the true centre frequency. The consequence of doing this is that this centred filter will further degrade the transmit accuracy of signals centred on 1902.4 MHz and 1902.6 MHz.

As will be explained below, in a preferred embodiment of the present invention, the amplitude equalizing section of the digital pre-equalizer can be easily set up in manufacture to be optimised for the specific centre frequency. Also, if required, the coefficients can be changed remotely when the unit is in the field via software control to enable the unit to transmit on either of the channel centres.

Referring now to FIG. 1, a transmitter architecture 100 is designed for use in Node B equipment 200 of a TDD UMTS system (not shown). The Node B equipment is suitable for co-siting. It will be understood that co-siting covers:

a single antenna shared between TDD and FDD base stations a single antenna shared between TDD and TDD base stations each base station having its own antenna, but multiple base station antennas occupying the same tower at the same cell site.

As will be explained in greater detail below, the transmitter architecture 100 incorporates digital pre-equalization utilising the present invention. The transmit architecture 100 includes a transmit filter section 110, a digital pre-equalizer section 120, a digital-to-analog converter (DAC) section 130, a transmitter section 140, and a post-conversion RF single channel filter section 150. I (In-phase) and Q (Quadrature-phase) components of a modulated transmit signal are applied to respective root-raised-cosine (RRC) filters 112 and 114 in the transmit filter section 110; the RRC filters 112 and 114 have real filter coefficients. The outputs of the RRC filters 112 and 114 are applied to a series arrangement of first FIR (Finite Impulse Response) digital filter 122 and a second FIR digital filter 124; the FIR digital filters 122 and 124, which have complex filter coefficients, will be described in greater detail below. The I and Q outputs from the second FIR digital filter 124 are applied to respective analog-to-digital filters 132 and 134. The outputs of the ADC converters 132 and 134 are applied to a transmit up-converter 142 to produce a single transmit output signal of upwardly-translated frequency. The output of the transmit up-converter 142 is applied to an RF single-channel filter 152, to produce an accurate and highly band-limited transmit output signal T.

The function of the digital pre-equalizer section 120 is to correct for the non-ideal passband characteristics of the single-channel RF filter 152. These non-ideal characteristics can be resolved into two separate factors:

Non-constant group-delay, which is equivalent to a non-linear phase vs. frequency response; group delay variation is a consequence of designing the filter with a very steep transition region using a reasonable number of sections, and Premature roll-off in the pass band of the signal—a consequence of the filter design and practical realisation, i.e., a consequence of finite Q.

Each factor can be considered individually.

Group delay equalization is achieved by making use of the knowledge that a filter with symmetrical impulse response has the property of linear phase. Consequently, the FIR digital filter 122 is constructed to provide group-delay equalization by filtering the signal with a time-reversed version of the impulse response of the RF filter 152. The impulse response is obtained by applying the inverse discrete Fourier transform on the measured frequency response of the RF filter 152.

A suitable equalizer is obtained by truncating and quantising the impulse response. All the necessary processing can be readily computed by a typical desktop computer. It will be understood that the exact signal processing scheme applied in order to correct the phase response of the filter is not critical, and a suitable signal processing scheme will be within the knowledge of a person of ordinary skill in the field of the invention.

Figure 2:
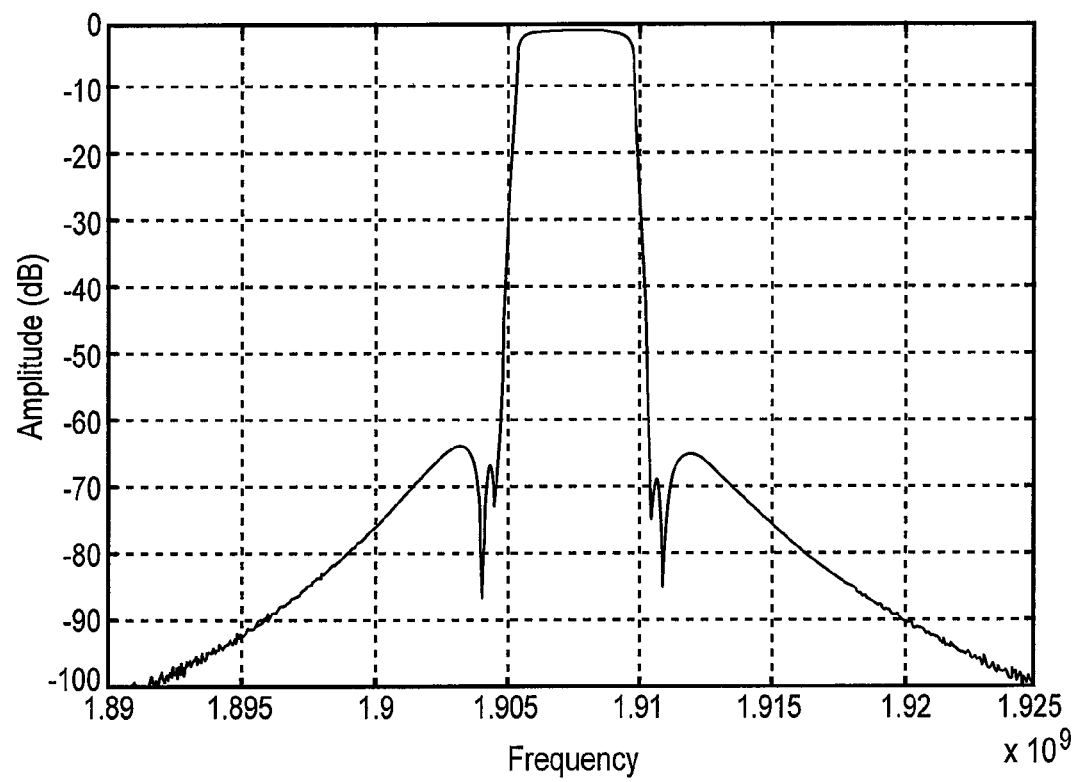
FIG. 2 shows a graphical representation of the magnitude response of a single channel RF filter.

FIG. 2 shows a graphical representation of the magnitude response of a single-channel, narrow-band RF filter used in a 1.9 GHz UTRA Node B.

Figure 3:
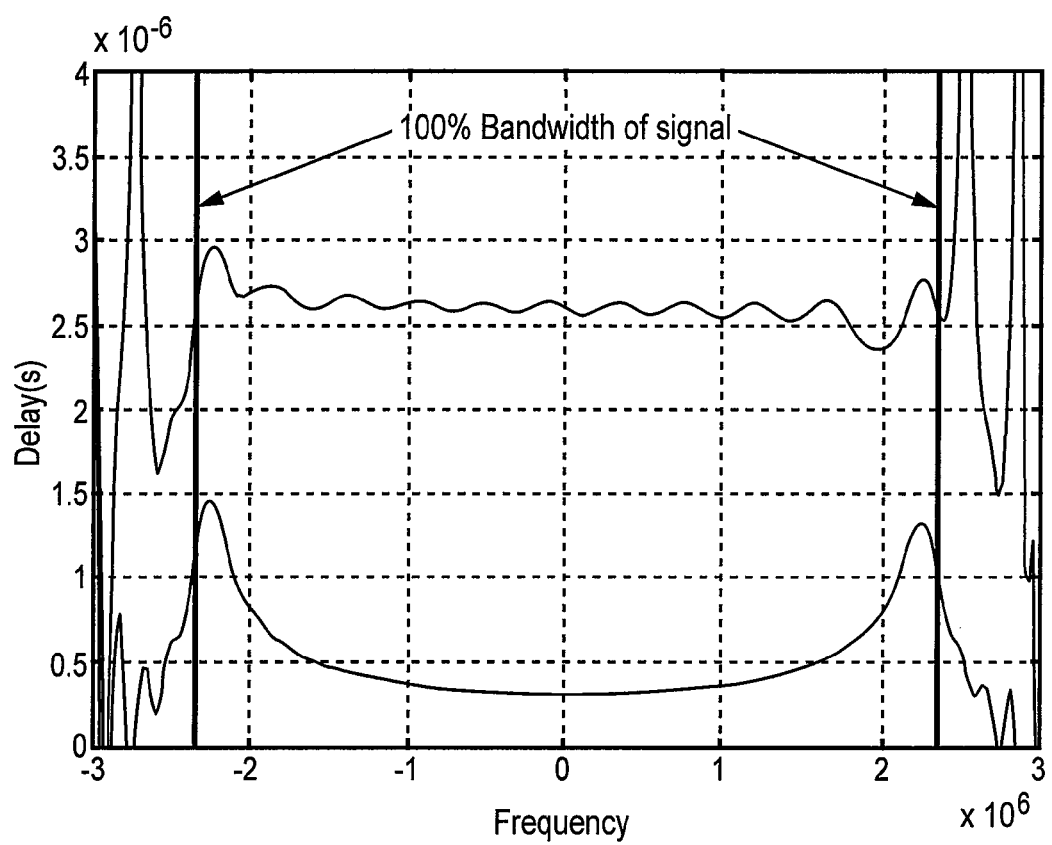
FIG. 3 shows a graphical representation of group delay improvement following introduction of a phase equalizing digital filter.

FIG. 3 shows the improvement in group delay by pre-filtering the transmitted data signal with the digital FIR filter 122, the upper and lower lines indicating the group delay with and without the pre-filtering respectively.

Although the phase-equalizing filter 122 provides sufficient correction for the non-linear phase response of the RF filter, the resulting improvement in transmit accuracy (Error Vector Magnitude) becomes limited by the amplitude roll-off in the pass-band. Therefore, it is necessary to introduce a correction for the amplitude response.

For this reason the second FIR filter 124 is used, which attempts a correction for amplitude response without impacting the phase correction properties of the first FIR filter 122. This criterion implies that the second, amplitude-correcting filter 124 must be a symmetrical FIR filter and thus exhibit linear phase.

This second filter 124 can also be used to make additional corrections, by correcting for asymmetrical RF filter response around the desired RF channel centre frequency, thus allowing one RF Filter to be optimised for centres offset from the true RF filter centre frequency by a small amount.

In the present example a single RF filter, centred on say 1902.5 MHz, can be optimised separately for channel centre frequencies of 1902.4 MHz and 1902.6 MHz, thus reducing the number of alternative RF filter solutions required.

Being digital, the equalizing filter 122 is programmable, providing the ability to optimise the filter response to permit a Node B to operate on either of these two frequencies in the field (e.g., via software control), without the requirement to change the RF filter.

It should also be noted that the phase-equalizing filter 122 also emphasises the amplitude roll-off of the RF filter as the signal is effectively filtered twice; therefore, the inclusion of the phase equalizer 122 increases the need for the amplitude equalizer 124.

Figure 4:
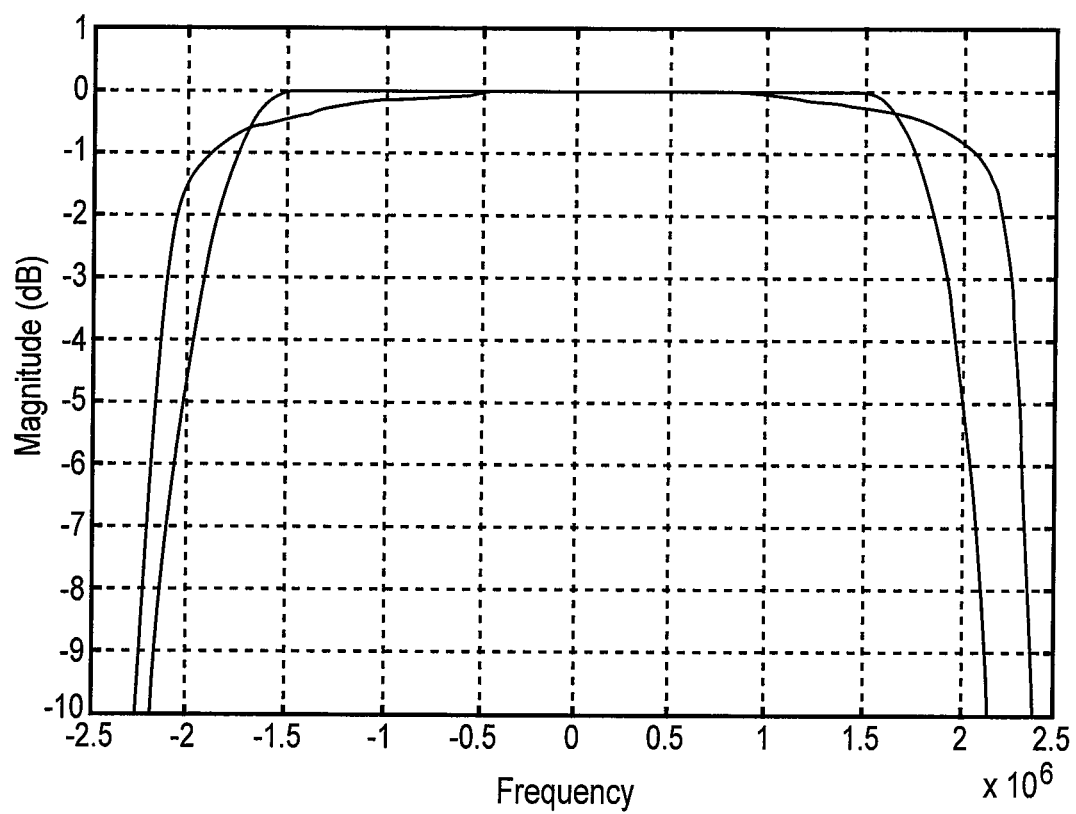
FIG. 4 shows a graphical representation of an ideal modulation mask and RF filter amplitude roll-off.

FIG. 4 compares the amplitude response of the ideal modulation mask (narrower shape) and the RF filter (wider shape). It may be noted that a 100 KHz offset exists between the RF filter and the modulation, resulting in more attenuation on the low side of the modulation.

Even though the amplitude roll-off is small (typically the RF filter has rolled off by 1 dB at the 3 dB points on the modulation mask) the effect on EVM is significant. Characterization of several RF filters has shown that applying only phase equalization results in EVMs around 8% (reduced from 17% for the un-equalized filter). Applying amplitude equalization can improve the error vector to an acceptable level of approximately 3%.

To design the FIR filter 124, a 'least-squares' filter design program is used. Such a design program is readily available in commercial software, and need not be described in further detail. As the required equalization response is asymmetrical and most commercial FIR filter design tools produce real-valued symmetrical FIR structures, the filter is designed as a pass-band filter which is then down-converted to a complex low-pass structure suitable for implementation in the transmit digital processing.

Figure 5:
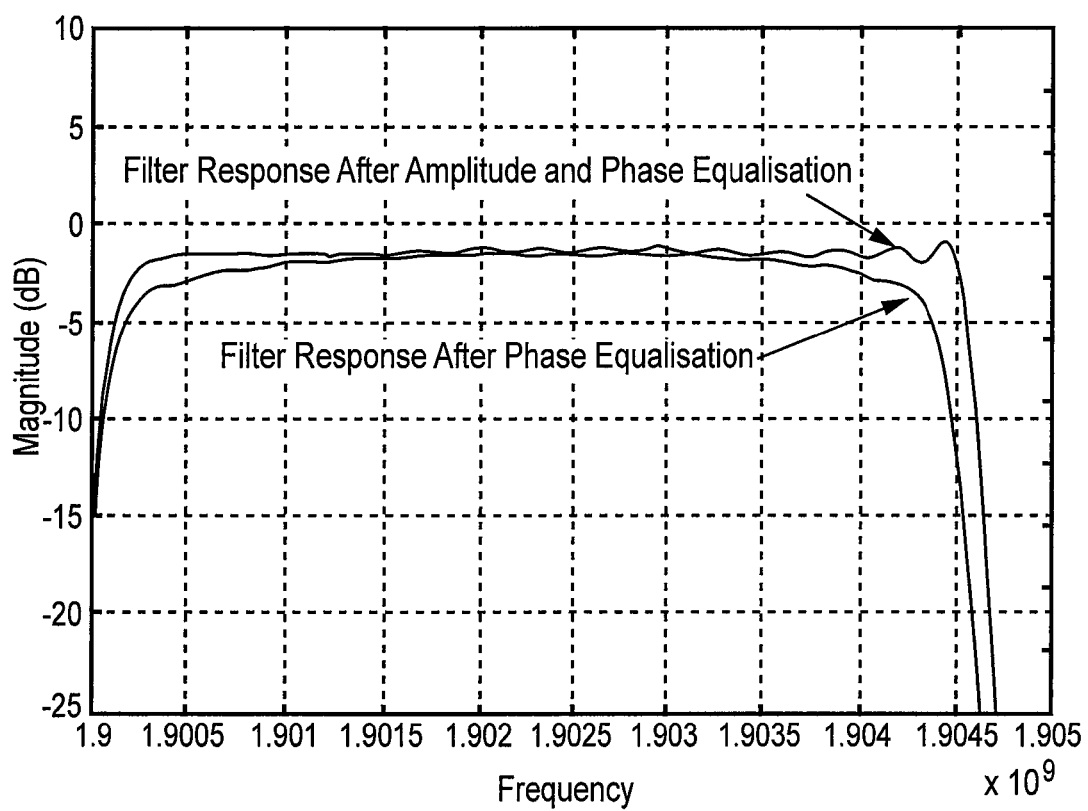
FIG. 5 shows a graphical representation of an example of amplitude equalized RF filter.

FIG. 5 shows an example of the result obtained from the amplitude equalizer, the lower and upper lines indicating respectively filter response after phase equalization only and after both amplitude and phase equalization. As can be seen by comparing the two lines, a significant improvement in the pass-band flatness is achieved.

The overall filter is simply obtained by convolving the impulse response from the phase equalizer and amplitude equalizer. The length of the filter is optimised by selecting the N consecutive coefficients that contain the highest accumulated energy. The number of taps, N, required is a function of the required equalization accuracy.

It will be understood that in the digitally pre-equalized transmitter architecture 100 described above and shown shown in FIG. 1, because the digital FIR filtering 120 equalises for errors in the analogue single-channel RF filter 152, the RF filter 152 may be deliberately designed to roll-off in the pass-band of the desired signal in order to achieve a specified stop-band attenuation for a smaller, cheaper RF filter implementation.

It will be understood that in the digitally pre-equalized transmitter architecture 100 described above and shown shown in FIG. 1, the single-channel RF filter 152 is the final component in the transmit architecture. In a TDD system it is possible to use the RF filter 152 for both transmit and receive functions. Although the receive signal processing is not shown, the digital equalizer can also be used this context.

Unlike the fixed definition transmit filter (root-raised-cosine with roll-off factor of 0.22 in the case of UMTS), the digital pre-equalizer needs to be fully programmable; therefore its associated implementation complexity is high in terms of its gate-count. Therefore, in practice, steps need to be taken to reduce the number of gates required.

The number of gates required to build each FIR filter are related to the length of the filter (i.e., number of coefficients) and the quantisation of both the data path and coefficient values. Simulations can be used to determine the optimum filter length and coefficient quantisation required based on a sample of RF filters.

By way of an example the response of several filters was measured and the appropriate equalizers were designed.

It was found that the impulse responses for all the filters tested was similar, therefore the size of the multipliers used to implement this filter could be optimised based on the magnitude of the expected value of the coefficients.

Figure 6:
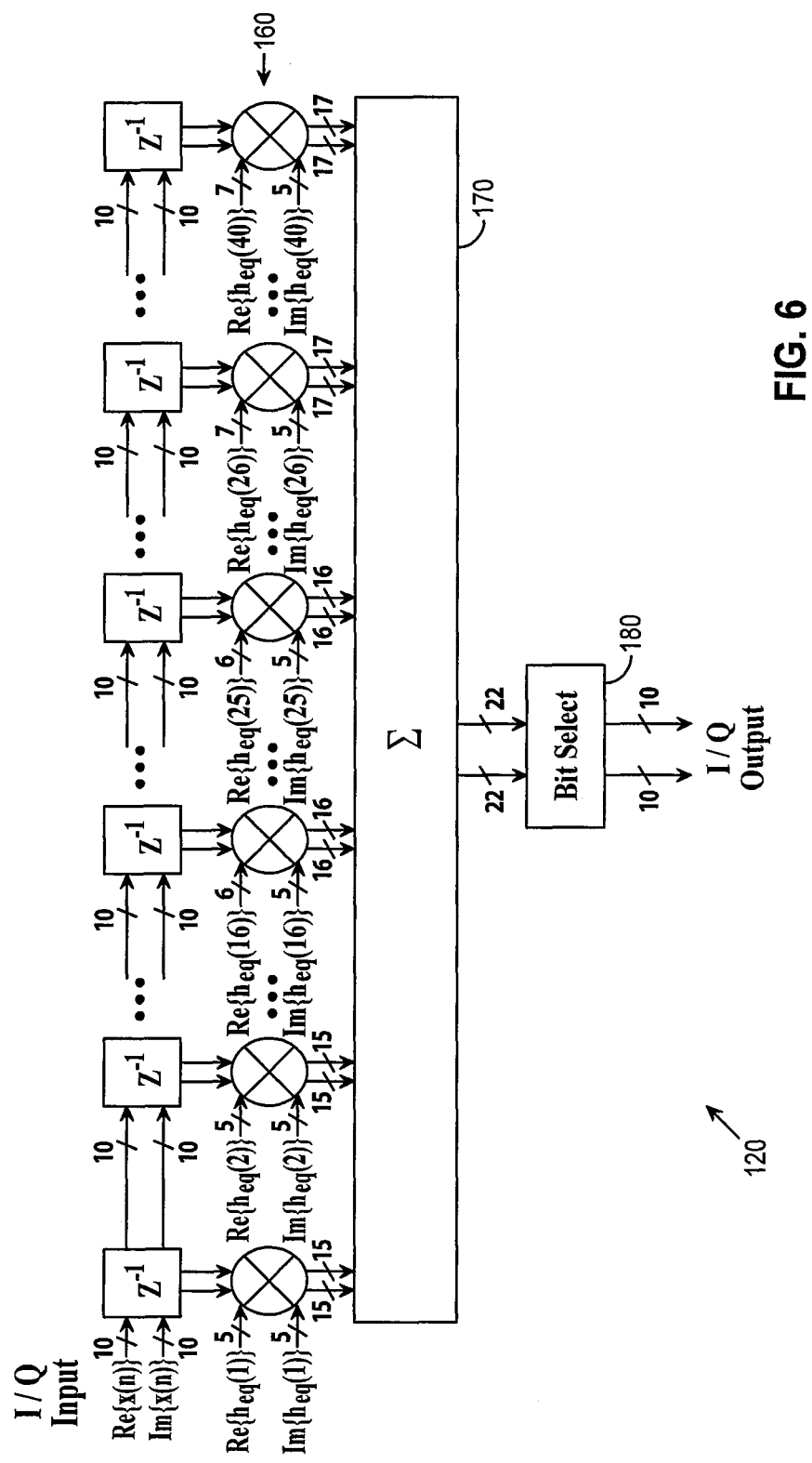
FIG. 6 shows a block-diagrammatic representation of an example implementation of the digital pre-equalizing FIR filter of FIG. 1.

FIG. 6 shows an implementation of the digital pre-equalizer section 120 based on the above example. As shown, the FIR digital filter (the overall filter, referred to above, obtained by convolving the impulse response from the phase equalizer 122 and amplitude equalizer 124) consists of 40 stages (of which six are shown). Each stage receives a 10-bit real value Re{x(n)} and a 10-bit imaginary value (Im{x(n)} representing the I/Q input signal x(n) to be filtered, and multiplies (in one of the multipliers 160) this received pair of values by a pair of values representing the real part Re{$h_{eq}$} and the imaginary part Im{$h_{eq}$} of a respective filter coefficient. The imaginary parts of the filter coefficients 1-40 are 5-bit values; the real parts of coefficients 1-15 are 5-bit values, the real parts of coefficients 19-25 are G-bit values, and the real parts of coefficients 26-40 are 7-bit values. Consequently, the multiplier outputs of the stages produce pairs of 15-bit values (stages 1-15), 16-bit values (stages 16-25), and 17-bit values (stages 26-40). The outputs of the multipliers 160 are combined in summer 170, whose output of a pair of 22-bit values is applied to a bit-select unit 180, which produces a pair of 10-bit output values representing the filtered I/Q signal.

It will be understood that the exact number of bits used in the filter is not important, but that it is desirable for the number of bits used in the filter to be optimised to reduce the complexity.

It will be appreciated that, in the application of the present example, the coefficients of the equalizer filter are complex rather than real-only, and that as a consequence the filter is more complex. A filter with complex input data and real-only coefficients has to implement the same filtering on both real and imaginary input data; hence two multiplications are required for each I and Q data pair. If the coefficients are complex, then each multiplier has to be a full complex multiplier which results in four complex multiplications and two summations for each I and Q data pair. Therefore it is a significant benefit in terms of the complexity of the filter if the number of bits in the multipliers are minimised. In this application, the degrees of asymmetry in the filter response are small; therefore the filter coefficients can be optimised so that the largest coefficients are real. This allows the imaginary coefficients to be small and hence require a fewer number of bits. Also, only one part of the impulse response of the filter has coefficients with large magnitude; therefore the size of the programmable filter can be optimised to the general form expected for the equalizer response. It may be noted that each RF filter may require a slightly different impulse response, and the number of bits assigned to each section of the filter must take this variance into account.

It will thus be understood that there is an advantage to be had for a filter implementation which implements an asymmetrical amplitude and phase response by using a complex-coefficient filter and in which the coefficients themselves have been phase rotated to ensure that the largest coefficients are real; hence for relatively small amounts of filter asymmetry, the implementation complexity of the filter is minimised.

It will be understood that the digitally pre-equalized RF filtering scheme described above provides the following advantages:

it enables 3GPP Node B co-location specifications to be met while providing both good transmit accuracy and acceptable ISI performance; and it allows filter centre frequency to be field-tuned in software, permitting a basic RF single-channel filter to used with its centre frequency being field adjustable to a desired value centred on a UMTS channel.

The invention claimed is:

1. A filter arrangement for use in a wireless communication transmitter having a transmit section including a power amplifier, the arrangement comprising:
   a digital signals receiving section for receiving digital signals to be transmitted;
   a digital-to-analog (DAC) section for converting the digital signals to analog signals;
   an analog channel filter section for filtering the analog signals after processing by the power amplifier; and
   a digital pre-equaliser filter section coupled before the DAC section for filtering the digital signals, the digital pre-equaliser filter section being adapted to filter the digital signals:
      first, with a time reversed version of the impulse response of the analog channel filter section, to substantially correct for non-linear phase response in the analog channel filter section; and
      second to substantially correct for linear amplitude error response in the analog channel filter section.

2. The filter arrangement claim 1 further comprising an upconverter section coupled between the DAC converter section and the analog channel filter section for providing upward frequency translation.

3. The filter arrangement of claim 1 wherein the digital preequaliser filter section is adapted to adjust to a desired value for the centre frequency of the analog channel filter section.

4. The filter arrangement of claim 1 wherein the digital preequaliser filter section is programmable.

5. The filter arrangement of claim 1 wherein the digital preequaliser filter section has complex coefficients to provide asymmetric equalisation.

6. The filter arrangement of claim 1 wherein the arrangement is adapted for use in a received signal path.

7. The filter arrangement of claim 1 wherein the wireless communication system is a UMTS wireless communication system.

8. Node B equipment comprising the filter arrangement of claim 1.

9. A method for filtering in a wireless communication transmitter, the method comprising:
   receiving digital signals to be transmitted by a communication transmitter having a transmit section with a power amplifier;
   providing a digital-to-analog (DAC) section converting the digital signals to analog signals;
   providing an analog channel filter section filtering the analog signals after processing by the power amplifier; and
   providing a digital pre-equaliser filter section coupled before the DAC section to filter the digital signals, the digital pre-equaliser filter being adapted to filter the digital signals:
      first, with a time reversed version of the impulse response of the analog channel filter section, to substantially correct for non-linear phase response in the analog channel filter section; and
      second to substantially correct for linear amplitude error response in the analog filter section.

10. The method of claim 9 further comprising providing an upconverter section coupled between the DAC converter section and the analog channel filter section to provide upward frequency translation.

11. The method of claim 9 wherein the digital pre-equaliser filter section adjusts to a desired value for the centre frequency of the analog channel filter section.

12. The method of claim 9 wherein the digital pre-equaliser filter section is programmable.

13. The method of claim 9 wherein the digital pre-equaliser filter section has complex coefficients to provide asymmetric equalisation.

14. The method of claim 9 further comprising using the DAC section, the analog channel filter section and the digital pre-equaliser filter section in a received signal path.

15. The method of claim 9 wherein the wireless communication system is a UMTS wireless communication system.

16. The method of claim 9 wherein the method is performed in Node B equipment.

17. The method of claim 9 wherein the step of providing the digital pre-equaliser filter section includes:
   performing measurements of the analog channel filter section; and
   automatically calculating on the basis of the measurements coefficients of the digital pre-equaliser filter section.

18. The method of claim 9 wherein the step of providing the digital pre-equaliser filter section includes: providing quantised filter coefficients of the digital preequaliser filter section based on the impulse response of the digital pre-equaliser filter section.

* * * * *